US010805317B2

(12) United States Patent
Musuvathi et al.

(10) Patent No.: US 10,805,317 B2
(45) Date of Patent: *Oct. 13, 2020

(54) IMPLEMENTING NETWORK SECURITY MEASURES IN RESPONSE TO A DETECTED CYBER ATTACK

(71) Applicant: Microsoft Technology Licensing, LLC, Redmond, WA (US)

(72) Inventors: Madanlal S. Musuvathi, Redmond, WA (US); Todd D. Mytkowicz, Redmond, WA (US); Saeed Maleki, Seattle, WA (US); Yufei Ding, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

This patent is subject to a terminal disclaimer.

(21) Appl. No.: 15/624,614

(22) Filed: Jun. 15, 2017

(65) Prior Publication Data
US 2018/0367550 A1 Dec. 20, 2018

(51) Int. Cl.
*H04L 29/06* (2006.01)
*G06N 7/00* (2006.01)
(Continued)

(52) U.S. Cl.
CPC ........ *H04L 63/1416* (2013.01); *G06N 7/005* (2013.01); *G06N 20/00* (2019.01);
(Continued)

(58) Field of Classification Search
CPC ... H04L 63/20; H04L 9/3268; H04L 63/0428; H04L 63/06; H04L 63/0823;
(Continued)

(56) References Cited

U.S. PATENT DOCUMENTS

| 7,451,071 B2 | 11/2008 | Ferguson et al. |
| 7,996,814 B1 | 8/2011 | Qureshi et al. |

(Continued)

FOREIGN PATENT DOCUMENTS

| CN | 104598565 A | 5/2015 |
| CN | 102750309 B | 6/2015 |

(Continued)

OTHER PUBLICATIONS

"Applicant Initiated Interview Summary Issued in U.S. Appl. No. 15/624,660", dated Feb. 26, 2019, 3 Pages.
(Continued)

*Primary Examiner* — Andrew J Steinle
*Assistant Examiner* — Sakinah White Taylor
(74) *Attorney, Agent, or Firm* — Newport IP, LLC; Jacob P. Rohwer

(57) ABSTRACT

Described herein is a system transmits and combines local models, that individually include a set of local parameters computed via stochastic gradient descent (SGD), into a global model that includes a set of global model parameters. The local models are computed in parallel at different geographic locations (e.g., different instances of computing infrastructure) along with symbolic representations. Network transmission of the local models and the symbolic representations, rather than transmission of the large training data subsets processed to compute the local models and symbolic representations, conserves resources and decreases latency. The global model can then be used as a model to determine a likelihood that at least a portion of current and/or recently received data traffic is illegitimate data traffic that is associated with a cyber attack. In some instances, the system can implement a remedial action to mitigate the effects of the cyber attack on computing infrastructure.

20 Claims, 8 Drawing Sheets

(51) Int. Cl.
 G06N 20/00 (2019.01)
 G06N 20/20 (2019.01)
(52) U.S. Cl.
 CPC ......... *G06N 20/20* (2019.01); *H04L 63/0236* (2013.01); *H04L 63/1425* (2013.01); *H04L 63/1458* (2013.01)
(58) Field of Classification Search
 CPC ... H04L 63/102; G06F 21/335; G06F 21/602; G06F 21/604; G06F 21/64
 USPC ......................................................... 713/168
 See application file for complete search history.

(56) References Cited

U.S. PATENT DOCUMENTS

| | | | |
|---|---|---|---|
| 8,060,456 | B2 | 11/2011 | Gao et al. |
| 8,626,677 | B2 | 1/2014 | Chen et al. |
| 8,743,543 | B2 | 6/2014 | Clidaras et al. |
| 9,201,989 | B2 | 12/2015 | Haas et al. |
| 9,218,573 | B1 | 12/2015 | Corrado et al. |
| 9,240,184 | B1 | 1/2016 | Lin et al. |
| 9,418,334 | B2 | 8/2016 | Sainath et al. |
| 9,563,854 | B2 | 2/2017 | Cruz Mota et al. |
| 9,948,663 | B1 | 4/2018 | Wang et al. |
| 2001/0032198 | A1* | 10/2001 | Pao ...................... G06K 9/6232 706/2 |
| 2007/0150424 | A1 | 6/2007 | Igelnik |
| 2008/0209030 | A1 | 8/2008 | Goldszmidt et al. |
| 2008/0228680 | A1 | 9/2008 | Chen et al. |
| 2009/0024356 | A1 | 1/2009 | Platt et al. |
| 2009/0172024 | A1 | 7/2009 | Hsu et al. |
| 2011/0093416 | A1 | 4/2011 | Pelossof et al. |
| 2011/0191315 | A1 | 8/2011 | Neumeyer et al. |
| 2011/0208714 | A1* | 8/2011 | Soukal ................ H04L 63/1425 707/709 |
| 2011/0295774 | A1 | 12/2011 | Chen et al. |
| 2014/0100703 | A1 | 4/2014 | Dull et al. |
| 2014/0142929 | A1 | 5/2014 | Seide et al. |
| 2014/0164299 | A1 | 6/2014 | Sainath et al. |
| 2014/0214735 | A1 | 7/2014 | Harik |
| 2014/0316809 | A1 | 10/2014 | Cane |
| 2015/0019214 | A1 | 1/2015 | Wang et al. |
| 2015/0161988 | A1 | 6/2015 | Dognin et al. |
| 2015/0193695 | A1 | 7/2015 | Cruz mota et al. |
| 2016/0036837 | A1* | 2/2016 | Jain .................... H04L 63/1416 726/23 |
| 2016/0071023 | A1 | 3/2016 | Eicher et al. |
| 2016/0103559 | A1 | 4/2016 | Maheshwari et al. |
| 2016/0104076 | A1 | 4/2016 | Maheshwari et al. |
| 2017/0006135 | A1 | 1/2017 | Siebel et al. |
| 2017/0017886 | A1 | 1/2017 | Gao et al. |
| 2017/0147920 | A1 | 5/2017 | Huo et al. |
| 2017/0213148 | A1* | 7/2017 | Mytkowicz ............ G06N 20/00 |
| 2017/0293638 | A1* | 10/2017 | He ...................... G06F 16/5846 |
| 2018/0365093 | A1 | 12/2018 | Musuvathi et al. |
| 2018/0365580 | A1 | 12/2018 | Musuvathi et al. |
| 2018/0365582 | A1 | 12/2018 | Musuvathi et al. |

FOREIGN PATENT DOCUMENTS

| | | | |
|---|---|---|---|
| WO | 2009100528 | A1 | 8/2009 |
| WO | 2015003436 | A1 | 1/2015 |
| WO | 2015103514 | A1 | 7/2015 |
| WO | 2015154216 | A1 | 10/2015 |

OTHER PUBLICATIONS

Bergstra, et al., "Theano: A CPU and GPU Math Compiler in Python", In the Proceedings of the 9th Python in Science Conference, Jul. 3, 2010, 7 Pages.
"Notice of Allowance Issued in U.S. Appl. No. 15/624,660", dated Apr. 24, 2019, 9 Pages.
Lee, et al., "On Model Parallelization and Scheduling Strategies for Distributed Machine Learning", In Proceedings of Advances in Neural Information Processing Systems, Published on: Dec. 3, 2014. 9 pages.
Keuper, et al., "Asynchronous Parallel Stochastic Gradient Descent—A Numeric Core for Scalable Distributed Machine Learning Algorithms", In Proceedings of the Workshop on Machine Learning in High-Performance Computing Environments, Published on: Nov. 15, 2015, 25 pages.
Zhang, et al., "Deep Learning with Elastic Averaging SGD", In Proceedings of Advances in Neural Information Processing Systems, Published on: Dec. 7, 2015, 24 pages.
Chen, et al., "Scalable Training of Deep Learning Machines by Incremental Block Training with Intra-Block Parallel Optimization and Blockwise Model-Updated Filtering", In Proceedings of IEEE International Conference on Acoustics, Speech and Signal Processing, Mar. 20, 2016, pp. 5880-5884.
Zinkevich, et al., "Parallelized Stochastic Gradient Descent", In Journal of Advances in neural information processing systems, Dec. 6, 2010, pp. 1-9.
Hammer, et al., "Automatic security classification by machine learning for cross-domain information exchange", In Proceedings of IEEE Military Communications Conference, Oct. 10, 26, 6 pages.
Mahajan, et al., "A Parallel SGD method with Strong Convergence", In Journal of Computing Research Repository, Nov. 2013, pp. 1-5.
Niu, et al., "Hogwild!: A Lock-Free Approach to Parallelizing Stochastic Gradient Descent", In Journal of Computing Research Repository, Jun. 2011, pp. 1-22.
Akbar, et al., "Improving network security using machine learning techniques", In Proceedings of IEEE International Conference on Computational Intelligence & Computing Research, Dec. 18, 2012, 2 pages.
Hadgu, et al., "Large-scale learning with AdaGrad on Spark", In Proceedings of IEEE International Conference on Big Data (Big Data), Oct. 29, 2015, pp. 2828-2830.
Singh, et al., "Integrating Machine Learning Techniques to Constitute a Hybrid Security System", In Proceedings of Fourth International Conference on Communication Systems and Network Technologies, Apr. 7, 2014, 2 pages.
Bach, Francis, "Stochastic gradient methods for machine learning", In Technical report of INRIA-ENS, Apr. 2013, 48 pages.
Bottou, Leon, "Large-Scale Machine Learning with Stochastic Gradient Descent", In Proceedings of 9th International Conference on Computational Statistics, Aug. 22, 2010, 10 pages.
Hegedus, et al., "Distributed Differentially Private Stochastic Gradient Descent: An Empirical Study", In Proceedings of 24th Euromicro International Conference on Parallel, Distributed, and Network-Based Processing, Feb. 17, 2016, 8 pages.
Seide, et al., "1-Bit Stochastic Gradient Descent and its Application to Data-Parallel Distributed Training of Speech DNNs", In Proceedings of 15th Annual Conference of the International Speech Communication Association, Sep. 14, 2014, pp. 1058-1062.
Zheng, et al., "SpeeDO: Parallelizing Stochastic Gradient Descent for Deep Convolutional Neural Network", http://web.archive.org/web/20151216151331/http:/learningsys.org/papers/LearningSys_2015_paper_13.pdf, Published on: Dec. 16, 2015, 1-6 pages.
Smola, Alexander J., "Adventures in Data Land", http://blog.smola.org/post/977927287/parallel-stochastic-gradient-descent, Published on: Sep. 2, 2010, 8 pages.
Meeds, et al., "MLitB: machine learning in the browser", In Journal of PeerJ Computer Science, vol. 1, Jul. 29, 2015, 18 pages.
Ruder, Sebastian, "An overview of gradient descent optimization algorithms", http://sebastianruder.com/optimizing-gradient-descent/, Published on: Jan. 19, 2016, 45 pages.
Delalleau, et al., "Parallel Stochastic Gradient Descent", In Journal of CIAR Summer School, Aug. 11, 2007, 29 pages.
"Big Data Analytics", https://www.ismll.uni-hildesheim.de/lehre/bd-16s/script/bd-08-sgd.pdf, Retrieved on: Oct. 17, 2016, pp. 1-27.
Smith, et al., "Neural networks in business: techniques and applications for the operations researcher", In Journal of Computers & Operations Research, vol. 27, Issues 11-12, Sep. 2000, pp. 1023-1044.

(56) References Cited

OTHER PUBLICATIONS

Bottou, Leon, "Stochastic Gradient Descent Tricks", In Publication of Springer, Jan. 1, 2012, pp. 1-16.
"Non Final Office Action Issued U.S. Appl. No. 15/624,555", dated Jun. 4, 2020, 16 pages.
Chapelle, et al., "Simple and Scalable Response Prediction for Display Advertising", in ACM Transactions on Intelligent Systems and Technology, vol. 5, Issue 4, Dec. 2014, 34 Pages.
Menon, et al., "Response Prediction Using Collaborative Filtering with Hierachies and Side-Information", In Proceedings of the 17th ACM SIGKDD International Conference on Knowledge Discovery and Data Mining, Aug. 21 2011, pp. 141-149.
"Non Final Office Action Issued in U.S. Appl. No. 15/624,642", dated Aug. 7, 2020, 30 Pages.
Lee, et al., "Multi-Level and Multi-Scale Feature Aggregation Using Pretrained Convolutional Neural Networks for Music Auto-Tagging", In Proceedings of IEEE Signal Processing Letters, vol. 24, Issue 8, Aug. 8, 2017, pp. 1208-1212.

* cited by examiner

IMPLEMENTING NETWORK SECURITY MEASURES IN RESPONSE TO A DETECTED CYBER ATTACK

BACKGROUND

As an increasing number of network services are provided, cyber attacks on computing infrastructures that execute the network services also is increasing. For instance, a denial-of-service (DoS) attack is a cyber attack that overwhelms servers, network links, network devices (e.g., routers, firewalls, etc.), and/or other components of computing infrastructure that provides a service with illegitimate network traffic. Due to the illegitimate network traffic, the servers, the network links, the network devices (e.g., routers, firewalls, etc.) and/or the other components of the computing infrastructure crash and/or are taken offline. Consequently, the service provided by the computing infrastructure becomes unavailable or is severely limited and cannot perform its intended use.

SUMMARY

The disclosed system provides an improved way to share information useable to detect a cyber attack, such as a denial of service (DoS) attack, on computing infrastructure. As described herein, the system can monitor data traffic patterns and use a model to determine that at least some of the data traffic received by computing infrastructure (e.g., a server, a router, a firewall device, etc.) is illegitimate data traffic that is associated with a cyber attack. If it is determined that a cyber attack is likely being carried out, the system is configured to implement a remedial action to mitigate the effects of the cyber attack. For example, the system can activate overflow or backup resources (e.g., servers) to perform functionality (e.g., handle client requests) that a current set of resources can no longer handle due to the cyber attack. In other examples, the system can block an Internet Protocol (IP) address of a host or a source of the illegitimate data traffic, classify the illegitimate data traffic as dangerous and prevent further connections to resources, and/or generate a notification of the illegitimate data traffic and communicate the notification to a device associated with a computing infrastructure administrator. The computing infrastructure administrator can then analyze the illegitimate data traffic and take action to mitigate the effects of the cyber attack, as well as update the security hardware and/or software of the computing infrastructure to prevent similar attacks in the future.

The system is configured to use a parallel implementation of stochastic gradient descent (SGD) that processes a training dataset to compute parameters for a model useable to determine a likelihood that data traffic is illegitimate data traffic associated with a cyber attack. The parameters computed via the parallel implementation of SGD accurately reflect parameters that would have been computed had the training dataset been processed via a sequential implementation of SGD. Stochastic gradient descent (SGD) comprises a method for regression and classification tasks. SGD uses a training dataset to generate a model via machine learning. SGD is typically a sequential algorithm which means that processing a current data instance of the training dataset to update parameters of the model depends on the parameters computed from the processing of a previous data instance of the training dataset. Stated another way, SGD iteratively processes data instances of the training dataset to compute (e.g., update) model parameters, and the computation at each iteration depends on the parameters learned from the previous iteration. Due to the sequential nature of SGD, however, computation of the parameters and generation of the model can take an extended period of time.

As described herein, the parallel implementation of SGD decreases an amount of time it takes to generate an improved model that can be used to help detect cyber attacks. The dataset can be referred to as a "training" dataset because a data instance in the training dataset can include a label indicating whether an outcome is true or false (e.g., whether the outcome occurs or not). For example, the label can indicate whether previously received data traffic is associated with a known cyber attack or not. Consequently, based on the labels associated with the data instances, the model can tune (e.g., update) its parameters via machine learning.

The system described herein is configured to use the model to determine a likelihood (e.g., a probability, a value, etc.) of an outcome associated with data traffic information. The model can be configured for use in association with network security systems and techniques. For instance, the model can be used by a security system to predict whether computing infrastructure is currently under attack (e.g., the security system may be part of the computing infrastructure).

A data instance comprises feature data for a feature set. The feature set can be defined by the system for security and detection of attacks. Thus, the feature set can include individual features, values for which are collected. The features can be related to data traffic information and can include, for example, a number of data packets received in a defined period of time (e.g., five seconds, ten seconds, thirty seconds, a minute, three minutes), a source or a host of a data packet identifiable via an Internet Protocol (IP) address, a rate at which data packets are received from a source or a host identifiable via an IP address, a number of connections established or attempted to be established in a defined period of time, a number of sources or hosts identifiable via IP addresses that attempt to establish a connection in a defined period of time, a size of a data packet, spacing of data packets, or any other features related to data traffic patterns of computing infrastructure (e.g., data packets received by the computing infrastructure over a defined period of time).

In various examples described herein, the training dataset used to compute the parameters for the model is split up amongst multiple instances of computing infrastructure. For example, a single provider may operate different instances of computing infrastructure (e.g., network resources, processing resources, storage resources, etc.) configured at different geographic locations to provide a network or cloud service (e.g., receive requests and respond to the requests). Or, multiple providers may operate different instances of computing infrastructure configured at different geographic locations to provide different services, yet may have an agreement to share information (e.g., models) related to cyber attacks with each other to improve network security and make sure the services continue to operate without interruption or with limited interruption.

Consequently, different instances of computing infrastructure can be configured and operated in different geographic locations, and each geographic location comprises a training data "subset". Moreover, the training data subsets are continually expanding. That is, each time an instance of computing infrastructure receives a new data instance of the feature set, it can eventually be added to a training data subset. For example, various models can be used to determine a likelihood of whether current or recently received data traffic is associated with a cyber attack given a new data instance (e.g., an unlabeled data instance of the feature set), and labels can subsequently be created based on whether the data traffic was actually a cyber attack. Thus, after using a model on the new data instance to determine a likelihood that data traffic is illegitimate data traffic associated with a cyber attack, the new data instance can become a training data instance that the model can use to update and tune its model parameters. Thus, the system can perform machine learning to improve the model.

In various examples, computing infrastructure at a geographic location can comprise a datacenter, or part of a datacenter, being operated by an entity providing a service. To implement parallelization of SGD, the computing infrastructure and each geographic location comprises a processing node. The processing node can be part of a security system. Given a set of starting model parameters so that the processing nodes of the multiple instances of computing infrastructure have the same initial state, the processing nodes are configured to compute, in parallel, "local" models where an individual local model comprises a set of local model parameters computed via SGD based on a corresponding training data subset that is local to a processing node and to the computing infrastructure with which the processing node is associated. For instance, one or more data instances of a training data subset can be used to update parameters of an individual local model at each step or iteration of an SGD algorithm (e.g., an average update over multiple data instances can be computed in an individual step or iteration of SGD). From a location standpoint, this enables the processing and computation to occur "close" to where the data (e.g., the data traffic information) is received and stored (e.g., a datacenter). A feature set can comprise hundreds or thousands, if not millions, of individual features. Moreover, thousands or millions of data instances of the feature set can be received by computing infrastructure over a period of time.

Consequently, a training data subset collected and maintained by computing infrastructure can comprise many terabytes of data or more, and as a result, transmitting the different training data subsets (e.g., a large amount of data) from the different geographic locations to one designated geographic location so that one processing node can process the whole training dataset via a sequential implementation of SGD to produce a more robust model requires a large amount of resources (e.g., networking resources, processing resources, memory resources, etc.), and also introduces latency that delays the computation of the model parameters. Moreover, timeliness associated with the computation of the model parameters via the sequential implementation of SGD also suffers due to the inherent delay caused by the sequential processing of the data instances in the training dataset. As described herein, computing local models in parallel at separate locations, transmitting the local models instead of transmitting the large training data subsets, and then combining the local models computed in parallel, is more efficient from a resource perspective.

In addition to computing the local models in parallel, the processing nodes are further configured to compute symbolic representations in parallel, the symbolic representations being respectively associated with the local models. The symbolic representations are used when combining the local models into a "global" model. A symbolic representation represents how an adjustment to a set of starting model parameters affects the set of local model parameters computed for a corresponding local model. The adjustment is an unknown adjustment at a time when a symbolic representation is computed. Since each processing node starts with the same initial state (e.g., the same set of starting model parameters) when processing a training data subset in parallel (e.g., concurrent processing), the symbolic representations enable the local models to be combined into a global model that includes a set of global model parameters. Via the use of the symbolic representations, the set of global model parameters are essentially the same as a corresponding set of model parameters that would have been computed had the local models and their training data subsets been computed sequentially via SGD, rather than in parallel. Stated another way, at a time when the local models are being combined, a symbolic representation associated with a local model enables the set of starting parameters to mathematically shift to a known set of starting model parameters associated with an output of another local model, the output comprising the set of local model parameters computed for the other local model. By using the symbolic representations, the combination of a plurality of local models, computed in parallel, into a global model honors the sequential dependencies of SGD. This parallelization approach can be applied when the update to the model parameters is linear in a SGD computation or is linearly approximated.

In various examples described herein, a processing node receives local models that individually comprise a set of local parameters computed via SGD from other processing nodes. The local models can be computed based on training data subsets collected and maintained at the geographic locations (e.g., datacenters). Each training data subset includes multiple data instances of a feature set and, for each data instance, a label indicating whether received data traffic comprises a known cyber attack. In some examples, a label can be a real number. As described above, network transmission of the local models, rather than the training data subsets, conserves resources and decreases latency. The processing node also receives, from the other processing nodes, symbolic representations associated with the local models. The processing node is configured to combine, using the symbolic representations, the local models into a global model that includes a set of global model parameters. The global model can then be used to determine a likelihood, given a new data instance of a feature set, of illegitimate data traffic associated with a cyber attack.

Using the likelihood computed by a model as an output, the system is configured to determine whether the likelihood satisfies, or exceeds, a threshold. For instance, the likelihood can be associated with probability value (e.g., 95%) and can be compared to a probability threshold (e.g., 90%, 80%, etc.) established by the system or set by a computing infrastructure administrator for security and detection purposes. The system can then implement a remedial action to mitigate any damaging effects that results from the cyber attack.

In various examples, each processing node can send its local model and symbolic representation to the other processing nodes such that each processing node can compute its own global model. However, in other examples, one processing node is designated as the processing node to which the local models and the symbolic representations are sent. In these other examples, upon combining the local models into a global model using the symbolic representations, the processing node is configured to distribute the global model to the other processing nodes so the other processing nodes can also use the more robust global model computed based on a larger amount of data (e.g., compared to the local model). Therefore, via the techniques described herein, a geographic location at which computing infrastructure is operated can leverage data collected and maintained at other geographic locations at which other computing infrastructure is operated, to generate a global model that is learned based on a complete training dataset spread across different geographic locations. The global model can be generated without having to transmit, over a network, large amounts of training data (e.g., data instances of the feature set).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide a system that transmits and combines local models, that individually comprise a set of local parameters computed via stochastic gradient descent (SGD), into a global model that comprises a set of global model parameters. The local models are computed in parallel at different geographic locations (e.g., different instances of computing infrastructure) along with symbolic representations. Network transmission of the local models and the symbolic representations, rather than transmission of the large training data subsets processed to compute the local models and symbolic representations, conserves resources and decreases latency. The global model can then be used as a model to determine a likelihood that at least a portion of current and/or recently received data traffic is illegitimate data traffic that is associated with a cyber attack (e.g., the computing infrastructure is currently the target of a cyber attack). In some instances, the system can implement a remedial action to mitigate the effects of the cyber attack on computing infrastructure.

Various examples, implementations, scenarios, and aspects are described below with reference to FIGS. 1 through 8.

Figure 1:
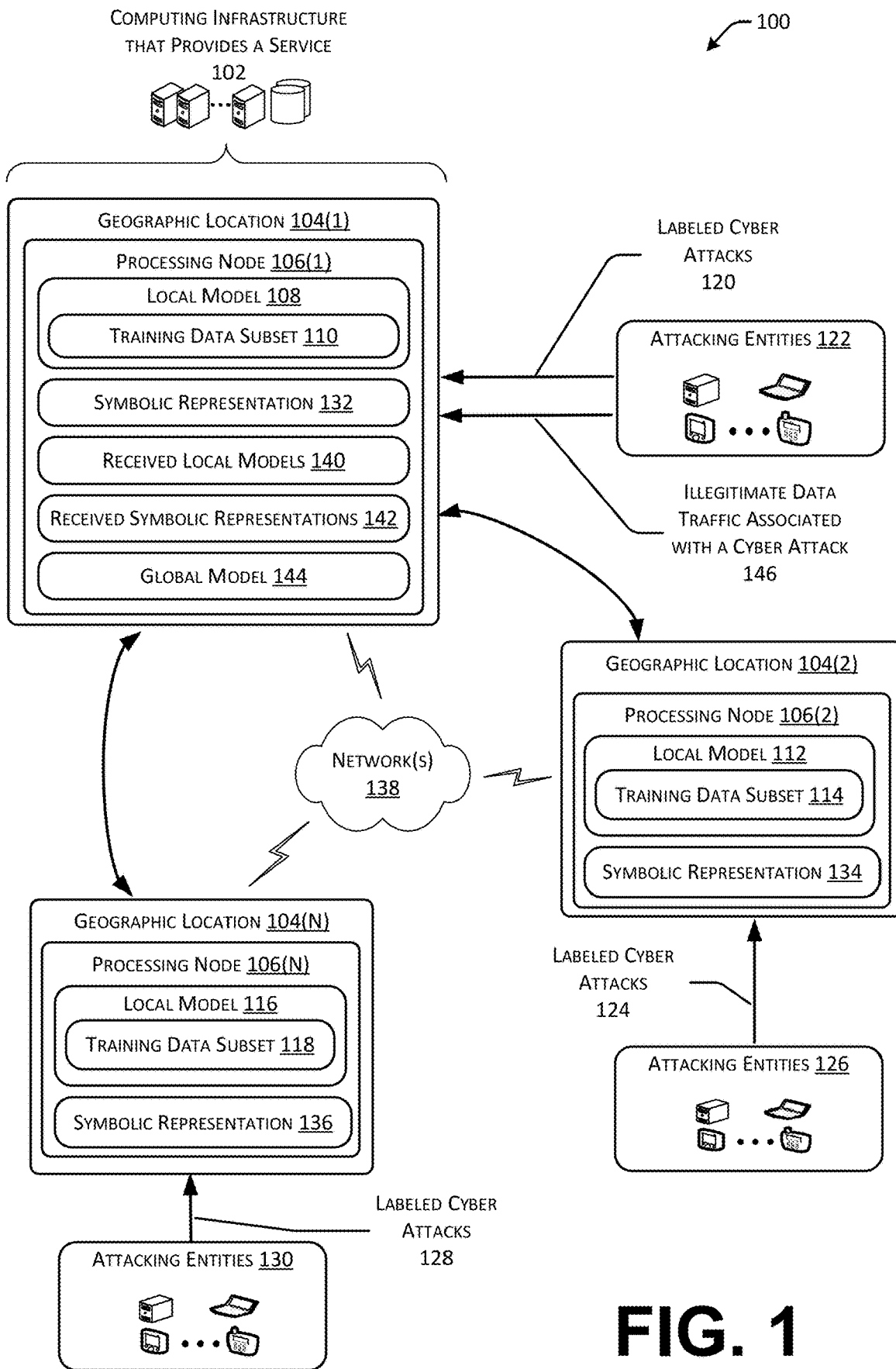
FIG. 1 is a diagram illustrating an example environment in which a system performs a parallel implementation of stochastic gradient descent (SGD) that processes a training dataset to compute parameters for a model that determines a likelihood of illegitimate data traffic that is associated with the cyber attack.

FIG. 1 is a diagram illustrating an example environment 100 in which a system performs a parallel implementation of stochastic gradient descent (SGD) that processes a training dataset to compute parameters for a model. The system can comprise computing infrastructure 102 configured to provide a service. The computing infrastructure 102 can include processing resources and storage resources (e.g., servers, disks, racks, etc.), as well as networking resources (e.g., switches, routers, firewall devices, etc.). As described above, the model is configured to compute a likelihood of illegitimate data traffic that is associated with a cyber attack. FIG. 1 illustrates a plurality of geographic locations 104(1) through 104(N) (where N is a positive integer number having a value of two or greater). As described above, an individual geographic location includes an instance of computing infrastructure, and in one example, an instance of computing infrastructure can comprise a datacenter or part of a datacenter. Thus, one or more entities that provide services can configure various instances of computing infrastructure across various geographic regions (e.g., a datacenter configured in the west of the United States, a datacenter configured in the south of the United States, a datacenter configured in the northeast of the United States, a datacenter configured in the Midwest of the United States, International datacenter(s) in different countries, etc.). A geographic location is configured to handle a request that is routed based on locality.

The model described herein can be configured for use in association with security systems configured to detect a cyber attack. That is, the model can be used to predict a likelihood of illegitimate data traffic that is associated with a cyber attack.

The geographic locations 104(1) through 104(N) include corresponding processing nodes 106(1) through 106(N). A processing node can comprise one or more of a device (e.g., a server), a processing core, a machine, and/or other processing resources useable to process training data to compute parameters for a model, as well as memory and/or networking resources configured to store, transmit, and/or receive data useable to generate the model. As further described herein, each processing node 106(1) through 106(N) is configured to compute a local model based on a training data subset. As illustrated, processing node 106(1) computes local model 108 by processing training data instances in training data subset 110. Processing node 106(2) computes local model 112 by processing training data instances in training data subset 114. Processing node 106(N) computes local model 116 by processing training data instances in training data subset 118.

The illustrated training data subsets 110, 114, 118 together comprise a whole training dataset that is spread across multiple geographic locations 104(1) through 104(N). Moreover, the training data subsets 110, 114, 118 individually comprise data that is local to a geographic location (e.g., data instances of a feature set that are locally routed and stored). For example, the training data subset 110 includes data instances of a feature set that correspond to labeled (e.g., known) cyber attacks 120 on the computing infrastructure 102 by attacking entities 122 (e.g., a botnet with a large number of zombie computers). The training data subset 114 includes data instances of a feature set that correspond to labeled cyber attacks 124 on additional computing infrastructure by attacking entities 126. And the training data subset 118 includes data instances of a feature set that correspond to labeled cyber attacks 128 on additional computing infrastructure by attacking entities 130. Since each geographic location 104(1) through 104(N) receives, stores, and processes a different training data subset 110, 114, 118 based on different cyber attacks by different attacking entities, then the local models 108, 112, 116 computed via SGD in parallel likely include different sets of local model parameters.

To compute the local models 108, 112, 116, the processing nodes 106(1) through 106(N) each start with a same initial state (e.g., a same set of starting parameters for the model). As further described herein, the processing nodes 106(1) through 106(N) are each configured to also compute a symbolic representation. A symbolic representation represents how an adjustment (e.g., a change, a shift, etc.) to the set of starting model parameters mathematically affects the set of local model parameters computed for a corresponding local model. The adjustment is an unknown adjustment at a time a symbolic representation is computed. As illustrated, processing node 106(1) computes symbolic representation 132. Processing node 106(2) computes symbolic representation 134. Processing node 106(N) computes symbolic representation 136.

In FIG. 1, processing nodes 106(2) through 106(N) associated with geographic locations 104(2) through 104(N) are configured to send, via network(s) 138, their local models 112, 116 and their symbolic representations 134, 136 to processing node 106(1) associated with geographic location 104(1). Thus, processing node 106(1) receives the local models 112, 116 and can store them as received local models 140 to go with its own local model 108. Moreover, processing node 106(1) receives the symbolic representations 134, 136 and can store them as received symbolic representations 142 to go with its own local symbolic representation 132. Consequently, the processing node 106(1) can combine the received local models 140 and its own local model 108, using the received symbolic representations 142 and/or its own local symbolic representation 132, to generate a global model 144 with a global set of parameters.

In various examples, processing node 106(1) is designated as the processing node to which processing nodes 106(2) through 106(N) send the local models 112, 116 and the symbolic representations 134, 136. Upon combining the local models 108, 112, 116 into a global model 144 using at least some of the symbolic representations 132, 134, 136, the processing node 106(1) can distribute the global model 144 to the other processing nodes 106(2) through 106(N) so the other geographic locations 104(2) through 104(N) can also use the more complete and more robust global model 144 computed based on a larger amount of data (e.g., compared to a local model) to determine a likelihood of illegitimate data traffic that is associated with a cyber attack. Once distributed, the global model 144 can then become a local model that is used to determine the likelihood of an outcome and the local model can begin to be updated at an individual geographic location based on new data instances received. Accordingly, subsequent iterations of computing and transmitting local models and symbolic representations to generate an updated global model can be performed (e.g., the system is always learning). As further described herein, iterations of generating a global model can be performed in accordance with a schedule that can be established by the computing infrastructure 102 to ensure that a variance associated with matrix projection is less than a threshold variance.

In some examples, a processing node designated to receive local models and symbolic representations may be an independent processing node (e.g., an independent location) that does not have its own local model and symbolic representation. In other examples, each processing node 106(1) through 106(N) can send its local model and symbolic representation to each of the other processing nodes such that each processing node 106(1) through 106(N) receives local models and symbolic representations and each processing node 106(1) through 106(N) can compute its own global model based on combining the local models.

The global model 144 is useable, given a new data instance of a feature set, to determine a likelihood of illegitimate data traffic (e.g., unlabeled) that is associated with a cyber attack 146. The new data instance is generated based on the data traffic information (e.g., legitimate data traffic, illegitimate data traffic, etc.) being monitored for the computing infrastructure. As described above, the feature set can comprise features related to a number of data packets received in a defined period of time (e.g., five seconds, ten seconds, thirty seconds, a minute, three minutes), a source or a host of a data packet identifiable via an Internet Protocol (IP) address, a rate at which data packets are received from a source or a host identifiable via an IP address, a number of connections established or attempted to be established in a defined period of time, a number of sources or hosts identifiable via IP addresses that attempt to establish a connection in a defined period of time, a size of a data packet, spacing of data packets, or any other features related to data traffic patterns of computing infrastructure (e.g., data packets received by the computing infrastructure over a defined period of time).

In various examples, the computing infrastructure 102 and/or the geographic locations 104(1) through 104(N) includes device(s). The device(s) and/or other components of the computing infrastructure 102 can include distributed computing resources that communicate with one another via network(s) 138. Network(s) 138 may include, for example, public networks such as the Internet, private networks such as an institutional and/or personal intranet, or some combination of private and public networks. Network(s) 138 may also include any type of wired and/or wireless network, including but not limited to local area networks ("LANs"), wide area networks ("WANs"), storage area networks ("SANs"), satellite networks, cable networks, Wi-Fi networks, WiMax networks, mobile communications networks (e.g., 3G, 4G, and so forth) or any combination thereof. Network(s) 138 may utilize communications protocols, including packet-based and/or datagram-based protocols such as Internet protocol ("IP"), transmission control protocol ("TCP"), user datagram protocol ("UDP"), or other types of protocols. Moreover, network(s) 138 may also include a number of devices that facilitate network communications and/or form a hardware basis for the networks, such as switches, routers, gateways, access points, firewalls, base stations, repeaters, backbone devices, and the like. In some examples, network(s) 138 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, the device(s) may include one or more computing devices that operate in a cluster or other grouped configuration to share resources, balance load, increase performance, provide fail-over support or redundancy, or for other purposes. For instance, device(s) may belong to a variety of classes of devices such as traditional server-type devices. Thus, devices of the computing infrastructure 102 may include a diverse variety of device types and are not limited to a particular type of device. Device(s) may represent, but are not limited to, server computers, desktop computers, web-server computers, file-server computers, personal computers, mobile computers, laptop computers, tablet computers, or any other sort of computing device.

Figure 2:
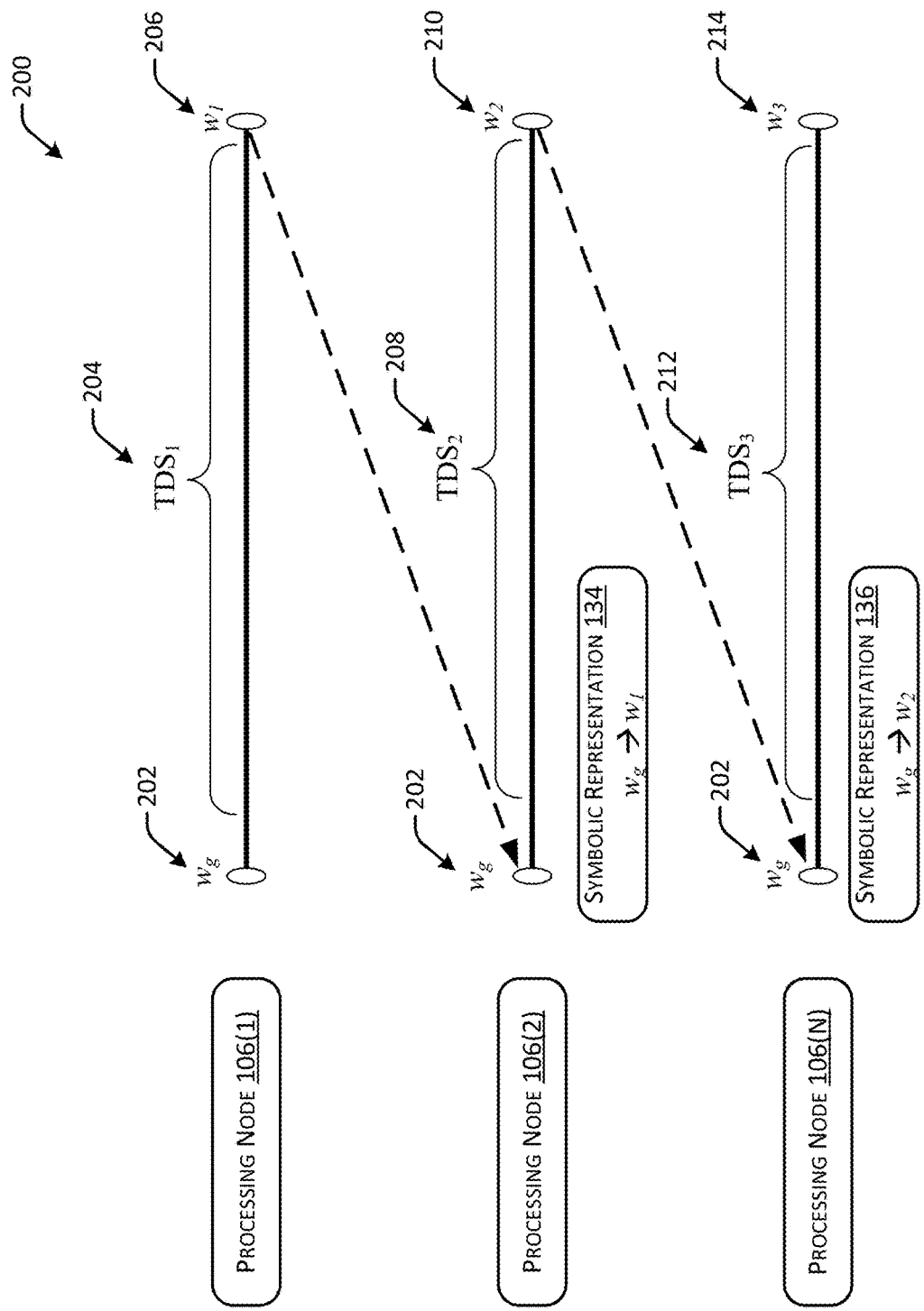
FIG. 2 is a diagram illustrating an example of how a symbolic representation can be used to adjust the set of local model parameters computed for an individual local model.

FIG. 2 is a diagram 200 illustrating an example of how a symbolic representation can be used to adjust the set of local model parameters computed for an individual local model.

As illustrated, each of processing nodes 106(1) through 106(N) starts its parallel computation of parameters for a local model with the same initial state (e.g., a starting set of parameters—$w_g$ 202 in the example of FIG. 2). For ease of discussion, N=3 in the example of FIG. 2, although the number of processing nodes and/or models to be combined can be large (e.g., tens, hundreds, thousands, even millions). Processing node 106(1) processes data instances of its training data subset 110 (e.g., represented as $TDS_1$ 204 in the example of FIG. 2) to compute a first set of parameters, $w_1$ 206, for local model 108. Processing node 106(2) processes data instances of its training data subset 114 (e.g., represented as $TDS_2$ 208 in the example of FIG. 2) to compute a second set of parameters, $w_2$ 210, for local model 112. And processing node 106(N) processes data instances of its training data subset 118 (e.g., represented as $TDS_3$ 212 in the example of FIG. 2) to compute a third set of parameters, $w_3$ 214, for local model 116.

Looking at the second processing node 106(2), computation starts at $w_g$ 202 while, in a sequential implementation of SGD that processes the training dataset based on the following order—$TDS_1$ 204, $TDS_2$ 208, and $TDS_3$ 212, the second processing node 106(2) should have started its computation at $w_1$ 206 (e.g., the output or the parameters computed by the first processing node 106(1)). Moreover, looking at the third processing node 106(N), computation starts at $w_g$ 202 while, in a sequential implementation of SGD, the third processing node 106(N) should have started its computation at $w_2$ 210 (e.g., the output or the parameters computed by the second processing node 106(2)).

To obtain sequential semantics, a symbolic representation is computed to represent how an adjustment to the set of starting model parameters, $w_g$ 202, affects the set of model parameters computed (e.g., $w_2$ 210 and $w_3$ 214). For example, at the combination stage, symbolic representation 134 is used to adjust, or shift, the starting point of the computation by the second processing node 106(2) from $w_g$ 202 to $w_1$ 206, as represented by the dashed line from $w_1$ 206 to $w_g$ 202 (e.g., the adjustment can be represented by $w_g + \Delta w$, where $\Delta w$ is the symbolic representation or an unknown symbolic vector). Based on the use of the symbolic representation 134, the output $w_2$ 210 can be updated to accurately reflect parameters that would have been computed via a sequential implementation of SGD. Similarly, symbolic representation 136 is configured to adjust, or shift, the starting point of the computation by the third processing node 106(N) from $w_g$ 202 to $w_2$ 210 (e.g., the updated parameters), as represented by the dashed line from $w_2$ 210 to $w_g$ 202. Thus, based on the use of the symbolic representation 136, the output $w_3$ 214 can be updated to accurately reflect parameters that would have been computed via a sequential implementation of SGD.

Consequently, via the use of the symbolic representations, a set of global model parameters determined via a combination of local models computed in parallel are essentially the same as a corresponding set of model parameters that would have been computed had the whole training dataset (e.g., the local models and their training data subsets) been computed sequentially via SGD at one processing node, rather than in parallel. In various examples, the order in which the local models are combined using the symbolic representations (e.g., the order in which the symbolic representations are applied) generates a set of global parameters that are essentially the same as a corresponding set of parameters that would have been computed had the local models and their corresponding training data subsets been computed sequentially via SGD in the same order. Stated another way, a symbolic representation associated with a local model enables the set of starting parameters to shift to a known set of starting model parameters associated with an output of another local model, the output comprising the set of local model parameters computed for the other local model. By using the symbolic representations, the combination of a plurality of local models, computed in parallel, into a global model honors the sequential dependencies of SGD. This parallelization approach can be applied when the update to the model parameters is linear in a SGD computation.

Based on the description above, one symbolic representation associated with the local model that is first in the order of combination may not be needed since the local model is not dependent on the output of a previous local model (e.g., the local model actually starts with the initial state—the starting model parameters). Therefore, no adjustment of the starting model parameters is needed. In FIG. 1, for example, local model 108 can be the first local model in the order of combination, and thus, symbolic representation 132 may not be used, or even computed.

Previous approaches directed to parallelizing SGD, such as HOGWILD! and ALLREDUCE, attempt to process a large training dataset (e.g., thousands of data instances, millions of data instances, etc.) to compute parameters for a model. However, these previous approaches do not honor the sequential dependencies of SGD described above, and thus, the previous approaches have poor convergence rates and/or poor scalability. For example, the previous approaches combine models in an ad-hoc manner without accounting for the adjustment represented by a symbolic representation described herein. Consequently, these previous approaches directed to parallelization of SGD compute model parameters based on a training dataset that are vastly different from model parameters that would have been computed via a sequential implementation of SGD based on the same training dataset.

Figure 3:
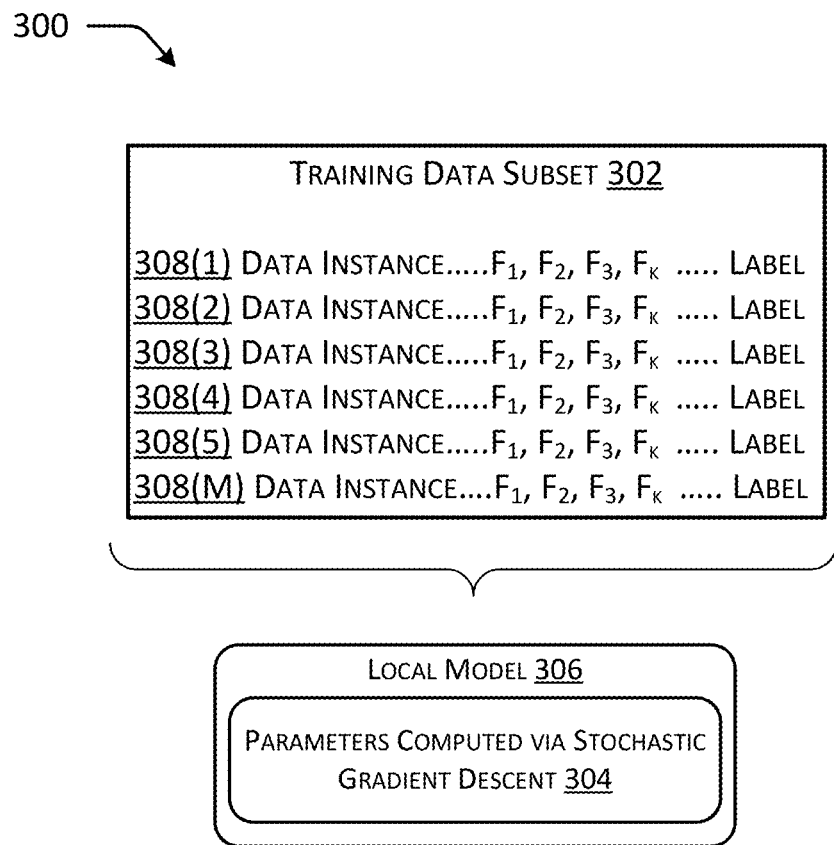
FIG. 3 is a diagram illustrating an example of a training data subset used to compute parameters of a local model, the training data subset including data instances of a feature set and a label.

FIG. 3 is a diagram 300 illustrating an example of a training data subset 302 (e.g., one of training data subsets 110, 114, 118) used to compute parameters 304 of a local model 306 (e.g., one of local models 108, 112, 116) via SGD. The training data subset 302 includes data instances 308(1) through 308(M) (where M is a positive integer number having a value of two or greater but likely is quite large—hundreds, thousands, millions, or even billions of data instances). In this example, an individual data instance 308(1) through 308(M) includes values (e.g., training data) for a feature set comprised of individual features $F_1$, $F_2$, $F_3$, ... $F_k$, as well as a label indicating whether an outcome is true or false (e.g., occurs or not).

The feature set can be defined by a system for security and cyber attack detection. Thus, the feature set can include individual features, values for which are collected. The features can be related to data traffic information, and therefore can include features related to a number of data packets received in a defined period of time (e.g., five seconds, ten seconds, thirty seconds, a minute, three minutes), a source or a host of a data packet identifiable via an Internet Protocol (IP) address, a rate at which data packets are received from a source or a host identifiable via an IP address, a number of connections established or attempted to be established in a defined period of time, a number of sources or hosts identifiable via IP addresses that attempt to establish a connection in a defined period of time, a size of a data packet, spacing of data packets, or any other features related to data traffic patterns of computing infrastructure (e.g., data packets received by the computing infrastructure over a defined period of time). The number of features k, values of which are collected for a data instance, can be large (e.g., hundreds, thousands, millions, even billions, etc.).

Figure 4:
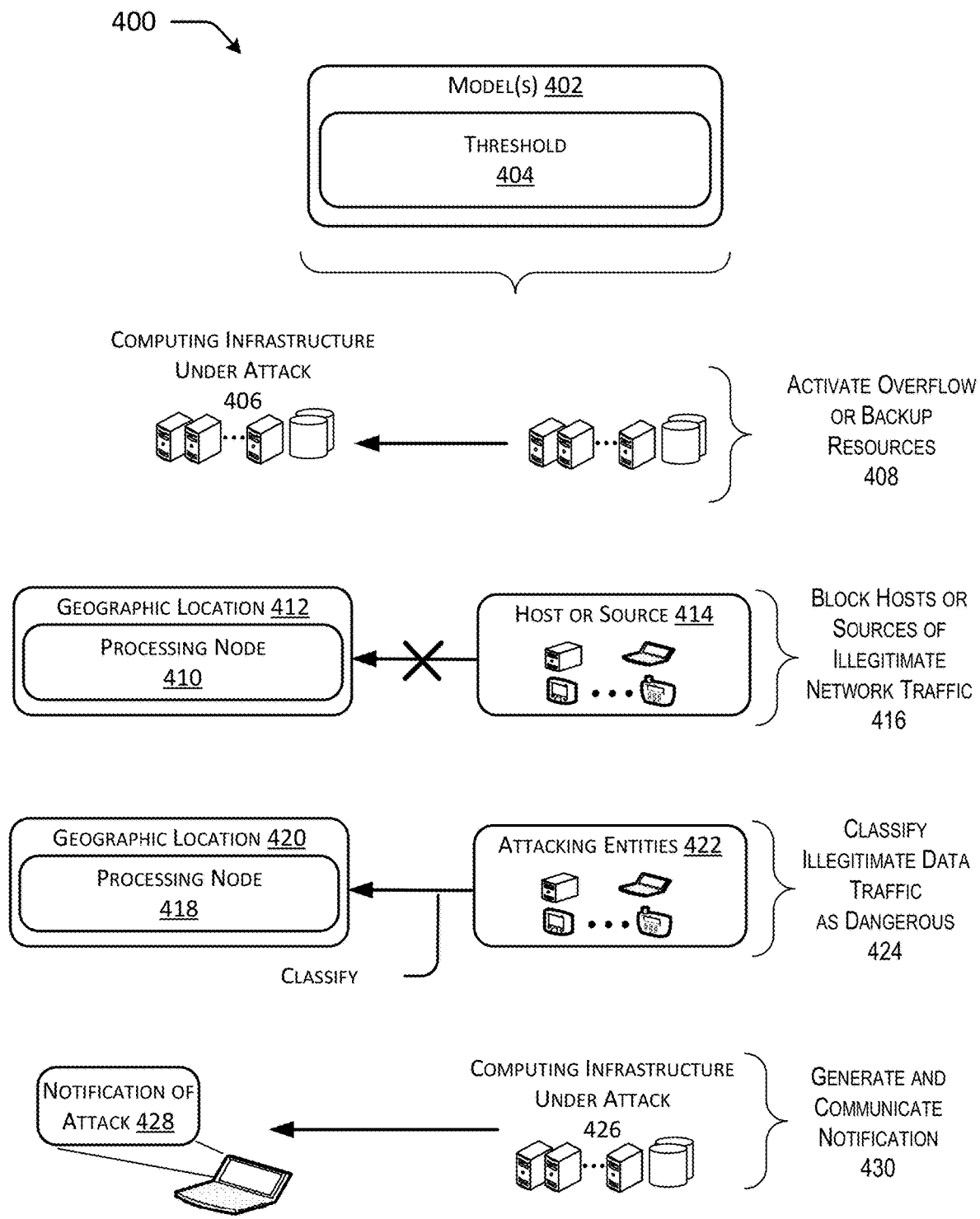
FIG. 4 is a diagram illustrating examples of a remedial action that can be taken in response to determining that the likelihood (e.g., a probability, value) of illegitimate data traffic associated with a cyber attack exceeds a threshold.

FIG. 4 is a diagram 400 illustrating examples of a remedial action that can be taken in response to a model 402 determining that the likelihood (e.g., a probability, value) of illegitimate data traffic associated with a cyber attack exceeds a threshold 404. As described above, the threshold 404 such as a threshold value (e.g., 90% in an event the model 402 is configured to compute a probability) can be established by a security system or set by a security expert (e.g., a computing infrastructure administrator). Given a new data instance provided as input to the model 402, the model 402 can provide an output (e.g., a likelihood or probability value) and the output can be compared to the threshold 404. When the comparison yields that the computed outcome exceeds the threshold 404, a security system deduces that computing infrastructure is likely under attack. Accordingly, a remedial action to mitigate the damaging effects of such an attack can be taken.

In a first example, computing infrastructure that is under attack 406 (e.g., computing infrastructure 102) can activate overflow or backup resources 408 such as servers to perform functionality (e.g., handle client requests) that a current set of resources can no longer handle due to the cyber attack. In a second example, a processing node 410 of a geographic location 412 can block an Internet Protocol (IP) address of a host or a source 414 of the illegitimate data traffic 416. In a third example, a processing node 418 of a geographic location 420 can classify the illegitimate data traffic received from attacking entities 422 as dangerous and prevent further connections to resources 424. And in a fourth example, computing infrastructure that is under attack 426 (e.g., computing infrastructure 102) can generate a notification 428 of the illegitimate data traffic and communicate the notification to a device associated with a computing infrastructure administrator 430. In this scenario, the computing infrastructure administrator can then analyze the illegitimate data traffic and take action to mitigate the effects of the cyber attack, as well as update the security hardware and/or software of the computing infrastructure to prevent similar attacks in the future.

Figure 5:
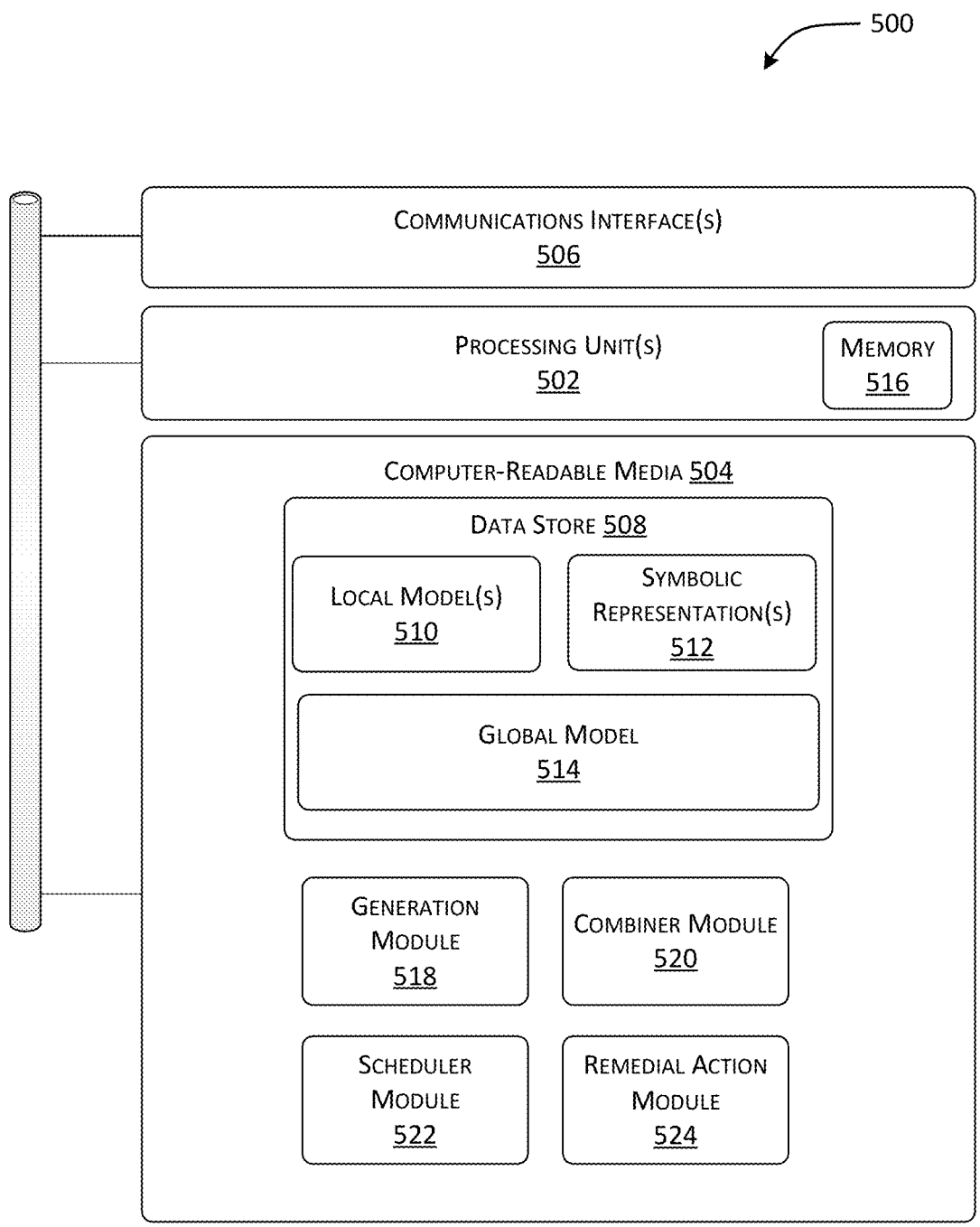
FIG. 5 is a diagram illustrating an example components of an example processing node (e.g., a device) configured to combine local models into a global model using symbolic representations.

FIG. 5 is a diagram illustrating example components of an example processing node 500 (e.g., a device) configured to combine local models into a global model using symbolic representations. The processing node 500 may be configured to operate at a geographic location 104(1) that is part of the system. The processing node 500 includes one or more processing unit(s) 502, computer-readable media 504, and/or communication interface(s) 506. The components of the processing node 500 can be operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as processing unit(s) 502, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 504, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 506 may represent, for example, network interface controllers ("NICs") or other types of transceiver devices to send and receive communications over a network.

In the illustrated example, computer-readable media 504 includes a data store 508. In some examples, data store 508 includes data storage such as a database, data warehouse, or other type of structured or unstructured data storage. The data store 508 may store data for the operations of processes, applications, components, and/or modules stored in computer-readable media 504 and/or executed by processing unit(s) 502. For instance, the data store 508 can include local models 510 (e.g., local model 108 and received local models 140), symbolic representations 512 (e.g., symbolic representation 132 and/or received symbolic representations 142), and a global model 514 (e.g., global model 144).

Alternately, some or all of the above-referenced data can be stored on separate memories 516 on board one or more processing unit(s) 502 such as a memory on board a CPU-type processor, a GPU-type processor, an FPGA-type accelerator, a DSP-type accelerator, and/or another accelerator.

The computer-readable media 504 also includes one or more modules such as a generation module 518, a combiner module 520, a scheduler module 522, and a remedial action module 524, although the number of illustrated modules is just an example, and the number may vary higher or lower. That is, functionality described herein in association with the illustrated modules may be performed by a fewer number of modules or a larger number of modules on one device or spread across multiple devices.

The generation module 518 is configured to compute, via SGD, a local model that comprises a set of local model parameters based on a training data subset that includes data instances of a feature set and a label indicating whether received data traffic comprises a known cyber attack. The generation module 518 is further configured to compute a symbolic representation associated with the local model. As described above, the symbolic representation represents how an adjustment to the set of starting model parameters affects the set of local model parameters computed for the local model. The symbolic representation comprises a matrix. In various examples, the generation module 518 is further configured to reduce a dimension of the matrix from a first dimensional space to a second dimensional space of smaller dimension (e.g., prior to transmitting the symbolic representation to other processing nodes). This reduces a size (e.g., an amount of data) of the matrix and also reduces an amount of time it takes to perform computation when the matrix is used to combine local models. The second dimensional space can be generated on random bases. In one example further described herein, reducing the dimension of the matrix comprises removal of an identity matrix from the matrix, where the identity matrix includes a diagonal entry.

The combiner module 520 is configured to combine the local models 510 to generate a global model 514. To do so, the combiner module 520 uses the symbolic representations 512 associated with the local models 512 to be combined (e.g., except the local model 510 that is first in the combination order). In some examples, upon generation, the combiner module 520 distributes the global model 514 to other processing nodes.

The scheduler module 522 determines a schedule for transmitting or exchanging local models 510 and symbolic representations 512 amongst processing nodes so that the global model 514 can be generated. In various examples, the schedule can be established to ensure that a variance associated with projecting the matrix from the first dimensional space to the second dimensional space is less than a threshold variance.

The remedial action module 524 is configured to determine when a likelihood exceeds a threshold and to cause a remedial action to be implemented when it is determined that the likelihood exceeds the threshold. That is, given a new data instance of the feature set (e.g., an unlabeled data instance) that is associated with current and/or recently received data traffic being monitored, the remedial action module 524 is configured to help mitigate damaging effects of a cyber attack or a potential cyber attack.

The generation module 518 is configured to generate a local model and a symbolic representation and/or the combiner module 520 is configured to combine the local models based on the following discussion. Given a training dataset $(X_{n \times f}, y_{n \times l})$, where f is the number of features in a feature set, n is the number of data instances in the training dataset, the $i^{th}$ row of matrix X, $X_i$, represents the features of the $i^{th}$ data instance, and $y_i$ is the dependent value (e.g., the label) of that data instance, a linear model seeks to find a set of parameters w* that minimizes an error function Q as follows in equation (1):

$$w^* = \underset{w \in R^f}{\operatorname{argmin}} \sum_{i=0}^{n} Q(X_i \cdot w, y_i) \qquad \text{equ. (1)}$$

The parameters (w*) for the model computed via SGD may be referred to as weights, and the weights can be generated for individual features in the feature set such that updating an individual parameter in the model may adjust how much an individual feature in the feature set contributes to determining the likelihood of the outcome. For linear regression, $Q(X_i \cdot w, y_i) = (X_i \cdot w - y_i)^2$. When $(X_i, y_i)$ is evident from the context, the error function can be referred to as $Q_i(w)$. SGD can iteratively find w* by updating the current model w with a gradient of $Q_r(w)$ for a randomly selected data instance r.

For the linear regression error function above (e.g., equation (1)), this amounts to the update as follows in equation (2):

$$w_i = w_{i-1} - \alpha \nabla Q_r(w_{i-1}) = w_{i-1} - \alpha(X_r \cdot w_{i-1} - y_r)X_r^T \qquad \text{equ. (2)}$$

Here, α is the learning rate that determines a magnitude of the update along the gradient. As shown in equation (2), $w_i$ is dependent on $w_{i-1}$, which creates a loop-carried dependence and consequently makes parallelization of SGD difficult.

The techniques described herein describe a parallelization approach to SGD that honors the aforementioned loop-carried dependencies. As described above, each processing node 106(1) through 106(N) begins computation of local model parameters for a local model with the same initial state (e.g., the same set of starting model parameters w) along with a symbolic unknown Δw that captures the realization that the starting model parameters used to begin the computation can change based on an output of another processing node (e.g., the model parameters computed by a previous processing node). If the dependence on Δw is linear during an SGD update, which is the case for linear regression, then the symbolic dependence on Δw to produce a final output can be captured by a matrix $M_{a \to b}$ that is a function of the input data instances $X_a, \ldots, X_b$ processed (e.g., $y_a, \ldots, y_b$ do not affect this matrix). This matrix, as follows in equation (3), is the symbolic representation that can be used to combine local models:

$$M_{a \to b} = \Pi_{i=b}^{a}(I - \alpha X_i^T \cdot X_i) \qquad \text{equ. (3)}$$

The symbolic representation in equation (3) above, which may also be referred to as a "combiner" matrix herein, represents how a change in the input to a local model will affect the output. $M_{a \to b}$ can be referred to by M when the inputs are not evident.

Accordingly, in a learning phase, each processing node i (e.g., each processing node 106(1) through 106(N)) starting from $w_0$ (e.g., the starting model parameters) computes both a local model $l_i$ and a combiner matrix $M_i$. Then, in a reduction phase, an individual processing node i can compute a true output using equation (4) as follows:

$$w_i = l_i + M_i \cdot (w_{i-1} - w_0) \qquad \text{equ. (4)}$$

Lemma (1), as provided herein, ensures that the combination (e.g., in a particular combination order) of local models, which have been computed in parallel based on training data subsets (e.g., by different processing nodes 106(1) through 106(N) at different geographic locations 104(1) through 104(N)), essentially produces the same output had the whole training dataset been computed sequentially (e.g., at a single processing node at a single geographic location). As described above, such parallelization enables conservation of resources because the training dataset does not have to be transmitted to, or collected at, a single location.

Lemma (1) provides, that if the SGD algorithm for linear regression processes data instances $(X_a, y_a), (X_{a+1}, y_{a+1}), \ldots, (X_b, y_b)$ starting from model $w_s$ to obtain $w_b$, then its outcome starting on model $w_s + \Delta w$ is given by $w_b + M_{a \to b} \cdot \Delta w$, where the combiner matrix $M_{a \to b}$ is given by equation (3). The proof follows from an induction. For example, starting from $w_s$, let the models computed by SGD after processing $(X_a, y_a), (X_{a+1}, y_{a+1}), \ldots, (X_b, y_b)$ respectively be $w_a, w_{a+1}, \ldots, w_b$. Consider a case of processing of $(X_a, y_a)$. Starting from $w_s + \Delta w$, SGD computes the model $w'_a$ using equation (2) (e.g., $w_i = w_{i-1} - \alpha(X_i \cdot w_{i-1} - y_i) X_i^T$) as follows:

$$w'_a = w_s + \Delta w - \alpha(X_a \cdot (w_s + \Delta w) - y_a) X_a^T \qquad \text{equ. (5)}$$

$$w'_a = w_s + \Delta w - \alpha(X_a \cdot w_s - y_a) X_a^T - \alpha(X_a \cdot \Delta w) X_a^T \qquad \text{equ. (6)}$$

$$w'_a = w_s - \alpha(X_a \cdot w_s - y_a) X_a^T + \Delta w - \alpha(X_a \cdot \Delta w) X_a^T \qquad \text{equ. (7)}$$

$$w'_a = w_a + \Delta w - \alpha(X_a \cdot \Delta w) X_a^T \qquad \text{equ. (8)}$$

$$w'_a = w_a + \Delta w - \alpha X_a^T(X_a \cdot \Delta w) \qquad \text{equ. (9)}$$

$$w'_1 = w_a + \Delta w - \alpha(X_a^T \cdot X_a) \cdot \Delta w \qquad \text{equ. (10)}$$

$$w'_a = w_a + (I - \alpha X_a^T \cdot X_a) \cdot \Delta w \qquad \text{equ. (11)}$$

Equation (8) uses equation (2), equation (9) uses the fact that $X_a \cdot \Delta w$ is a scalar (e.g., allowing it to be rearranged), and equation (10) follows from the associativity property of matrix multiplication. The induction is similar and follows from replacing Δw with $M_{a \to i-1} \Delta w$ and the property that:

$$M_{a \to i} = (I - \alpha X_i^T \cdot X_i) \cdot M_{a \to i-1} \qquad \text{equ. (12)}$$

Thus, the symbolic representation (e.g., a combiner matrix) can be generated and used by the combiner module 520 to combine local models.

In some instances, the combiner matrix M generated above can be quite large and expensive to compute. Sequential SGD maintains and updates a weight vector w, and thus requires O(f) space and time, where f is the number of features in a feature set. In contrast, the combiner matrix M is a f f matrix and consequently, the space and time complexity of parallel SGD is $O(f^2)$. To resolve this, a processing node is configured to project M into a smaller space while maintaining its fidelity, as provided via Lemma (2). That is, a set of vectors can be projected from a high-dimensional space to a random low-dimensional space while preserving distances. This property reduces a size of the combiner matrix without losing the fidelity of the computation. The projection can occur before the local model and/or symbolic representation is transmitted to other processing nodes.

Lemma (2)—Let A be a random f×k matrix with:

$$a_{ij} = d_{ij}/\sqrt{k} \qquad \text{equ. (13)}$$

Here, $a_{ij}$ is the element of A at the $i^{th}$ row and $j^{th}$ column, and $d_{ij}$ is independently sampled from a random distribution D with E[D]=0 and Var[D]=1. Then:

$$E[A \cdot A^T] = I_{f \times f} \qquad \text{equ. (14)}$$

Proof of Lemma (2)—Let $B = A \cdot A^T$. Then $b_{ij}$, the element of B at row i and column j, is $\Sigma_s a_{is} a_{js}$. Therefore:

$$E[b_{ij}] = \sum_{s=1}^{k} E[a_{is} a_{js}] = \left(\frac{1}{\sqrt{k}}\right)^2 \sum_{s=1}^{k} E[d_{is} d_{js}] = \frac{1}{k}\sum_{s=1}^{k} E[d_{is} d_{js}] \qquad \text{equ. (15)}$$

Because $d_{ij}$ are chosen independently, for i≠j:

$$E[b_{ij}] = \frac{1}{k}\sum_{s=1}^{k} E[d_{is}]E[d_{js}] \qquad \text{equ. (16)}$$

Since E[D]=0 and $d_{is}, d_{js} \in D$, $E[d_{is}] = E[d_{js}] = 0$ and consequently, $E[b_{ij}] = 0$.

For i=j:

$$E[b_{ii}] = \frac{1}{k}\sum_s E[d_{is}]E[d_{is}] = \frac{1}{k}\sum_s E[d_{is}^2] \qquad \text{equ. (17)}$$

Since $E[D^2] = 1$ and $d_{is} \in D$, $E[d_{is}^2] = 1$. As a result:

$$E[b_{ii}] = \frac{1}{k}\sum_{s=1}^{k} E[d_{is}^2] = \frac{1}{k}\sum_{s=1}^{k} 1 = 1 \qquad \text{equ. (18)}$$

The matrix A from Lemma (2) projects from $\mathbb{R}^f \to \mathbb{R}^k$, where k can be much smaller than f. This allows us to approximate equation (4) as follows:

$$w_i \approx l_i + M_i \cdot A \cdot A^T(w_{i-1} - w_0) \qquad \text{equ. (19)}$$

Lemma (2) essentially guarantees that the approximation above is unbiased, as follows:

$$E[l_i + M_i \cdot A \cdot A^T(w_{i-1} - w_0)] = l_i + M_i \cdot E[A \cdot A^T](w_{i-1} - w_0) = w_i \qquad \text{equ. (20)}$$

Consequently, an efficient algorithm that only computes the projected version of the combiner matrix while still producing the same answer as the sequential algorithm in expectation can be used. Such combiners may be referred to as "probabilistically" sound.

Example Algorithm (1), provided herein, shows how a local model and a corresponding symbolic representation can be generated.

| | Example Algorithm (1) |
|---|---|
| 1 | <vector,matrix,matrix> SymSGD( |
| 2 | float $\alpha$, vector: $w_0$, $X_1 \ldots X_n$, |
| 3 | scalar: $y_1 \ldots y_n$) { |
| 4 | vector $w = w_0$; |
| 5 | matrix $A = \ast$ random(D,f,k); |
| 6 | matrix $M_A = A$; |
| 7 | for i in (1 ... n) { |
| 8 | $w = w - \alpha(X_i \cdot w - y_i)X_i^T$; |
| 9 | $M_A = M_A - \alpha \cdot X_i (X_i^T M_A);$} |
| 10 | return <w, M, A>; } |

The random function in line 5 of Example Algorithm (1) returns a f×k matrix with elements chosen independently from the random distribution D according to Lemma (2). When compared to the sequential SGD, the additional work is associated with the computation of $M_A$ in line 9 of Example Algorithm (1). Example Algorithm (1) maintains the invariant that $M_A$=M·A at each step. This projection incurs a space and time overhead of O(f×k), which is acceptable.

Example Algorithm (2) combines the resulting probabilistically sound combiners, in addition to performing further computations discussed below.

| | Example Algorithm (2) |
|---|---|
| 1 | vector SymSGDCombine(vector $w_0$, |
| 2 | vector w, vector 1, |
| 3 | matrix $M_A$, matrix A) { |
| 4 | parallel { |
| 5 | matrix $N_A = M_A - A$; |
| 6 | $w = 1 + w - w_0 + N_A \cdot A^T(w-w_0)$; |
| 7 | } |
| 8 | return w; } |

A randomized SGD algorithm that generates an exact result in expectation can be associated with keeping the resulting variance small enough to maintain accuracy and the rate of convergence. A combiner matrix having small singular values can result in a small variance. The combiner matrix resulting from SGD described herein is dominated by the diagonal entries as the learning rate is small for effective learning. This property can be used to perform the projection after subtracting the identity matrix. Other factors that control the singular values are the learning rate, a number of processing nodes, and the frequency of combining local models (e.g., the schedule).

Consider the approximation of M·$\Delta$w with v=M·A·$A^T\Delta$w. Let $\mathbb{C}$(v) be the covariance matrix of v. The trace of the covariance matrix tr($\mathbb{C}$(v)) is the sum of the variance of individual elements of v. Let $\lambda_i(M)$ by the $i^{th}$ eigenvalue of M and $\sigma_i(M)=\sqrt{\lambda_i M^T M}$ singular value of M. Let $\sigma_{max}(M)$ be the maximum singular value of M. Then the following holds:

$$\frac{\|\Delta w\|_2^2}{k} =$$

$$\sum_i \sigma_i^2(M) \le tr(\mathbb{C}(v)) \le \frac{\|\Delta w\|_2^2}{k}\left(\sum_i \sigma_i^2(M) + \sigma_{max}^2(M)\right)$$

equ. (21)

The covariance is small if k, the dimension of the projected space, is large. But increasing k proportionally can increase the overhead of the parallel algorithm. Similarly, covariance is small if the projection happens on small $\Delta$w. Looking at equation (19), this means that should be as close to $w_0$ as possible, implying that the processing nodes should communicate frequently enough such that their models are roughly in sync.

Further, the singular values of M should be as small as possible in some examples, and thus, the identity matrix can be removed (e.g., subtracted, taken off, etc.). Expanding equation (3), the combiner matrices are of the form:

$$1-\alpha R_1 + \alpha R_2 - \alpha R_3 +$$

equ. (22)

Here, $R_i$ matrices are formed from the sum of products of $X_j \cdot X_j^T$ matrices. Since a is a small number, the sum is dominated by I. For a combiner matrix M generated from n data instances, M−I has at most n non-zero singular values. Accordingly, the variance of dimensionality reduction can be lowered by projecting matrix N=M−I instead of M. Rewriting equations (4) and (19), produces:

$$w_i = l_i + (N_i + I) \cdot (w_{i-1} - w_0)$$

equ. (23)

$$w_i = l_i + w_{i-1} - w_0 + N_i \cdot (w_{i-1} - w_0)$$

equ. (24)

$$w_i \approx l_i + w_{i-1} - w_0 + N_i \cdot A \cdot A^T \cdot (w_{i-1} - w_0)$$

equ. (25)

Lemma (2) ensures that the approximation above is unbiased. Example Algorithm 2 shows the pseudo code for the resulting probabilistically sound combination of local models. The function SymSGDCombine in Example Algorithm 2 is called upon iteratively to combine the model of one processing node with the local models of other processing nodes.

Figure 6:
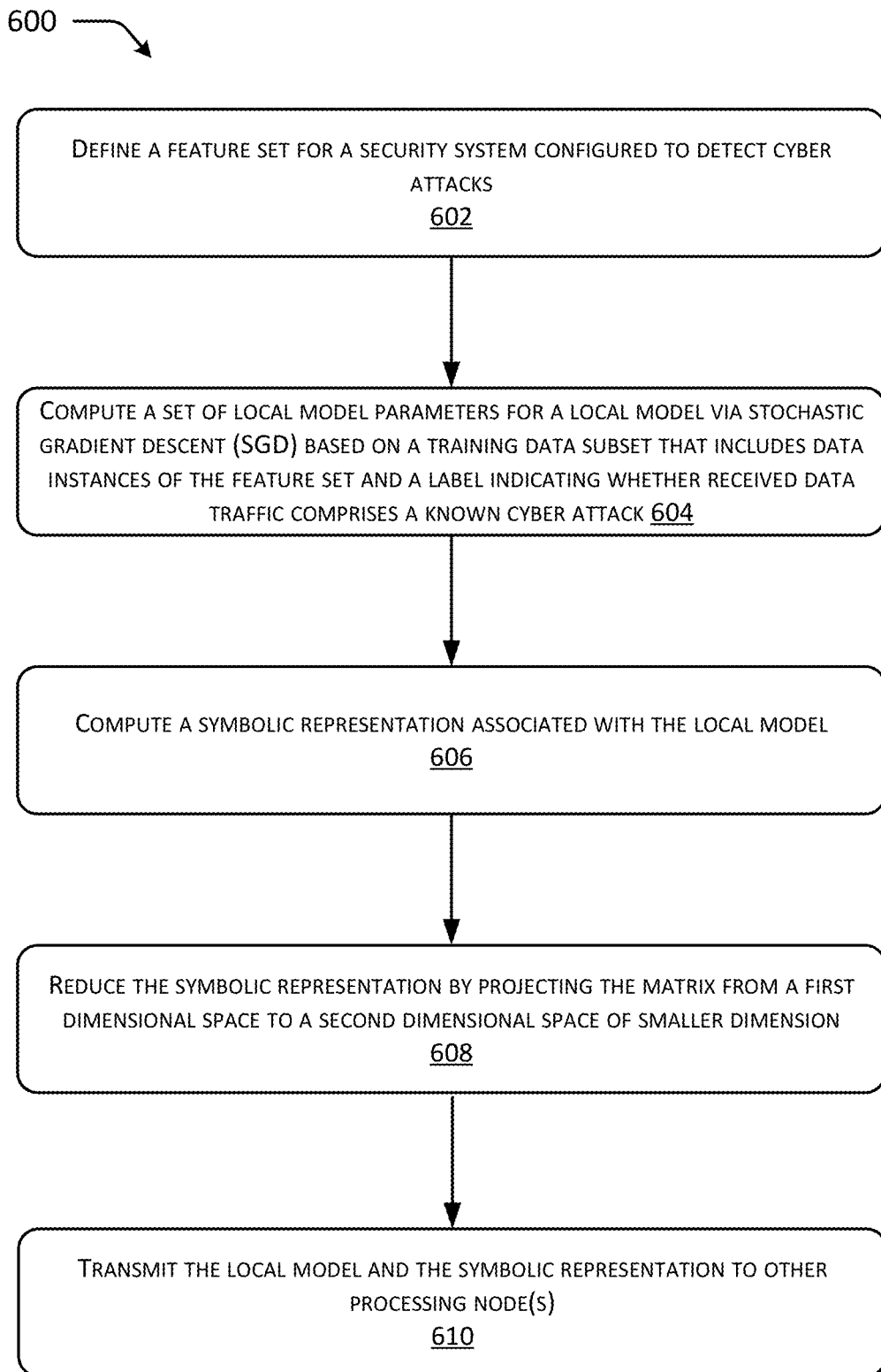
FIG. 6 is a diagram of an example flowchart that illustrates operations directed to computing a local model and a symbolic representation at a processing node, and subsequently sending the local model and the symbolic representation to other processing nodes so the local model can be combined with other local models to generate a global model.
Figure 7:
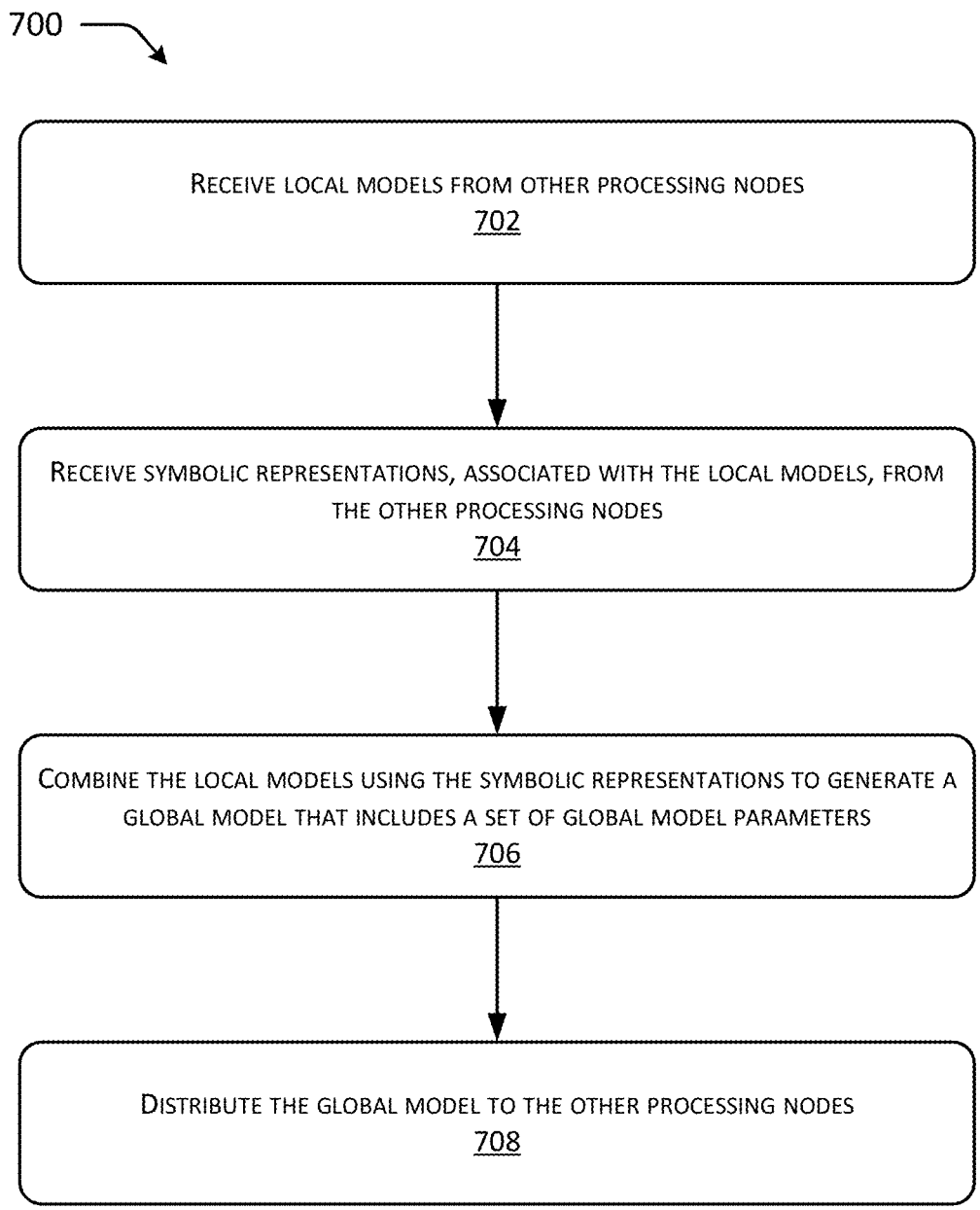
FIG. 7 is a diagram of an example flowchart that illustrates operations directed to combining local models into a global model using symbolic representations.
Figure 8:
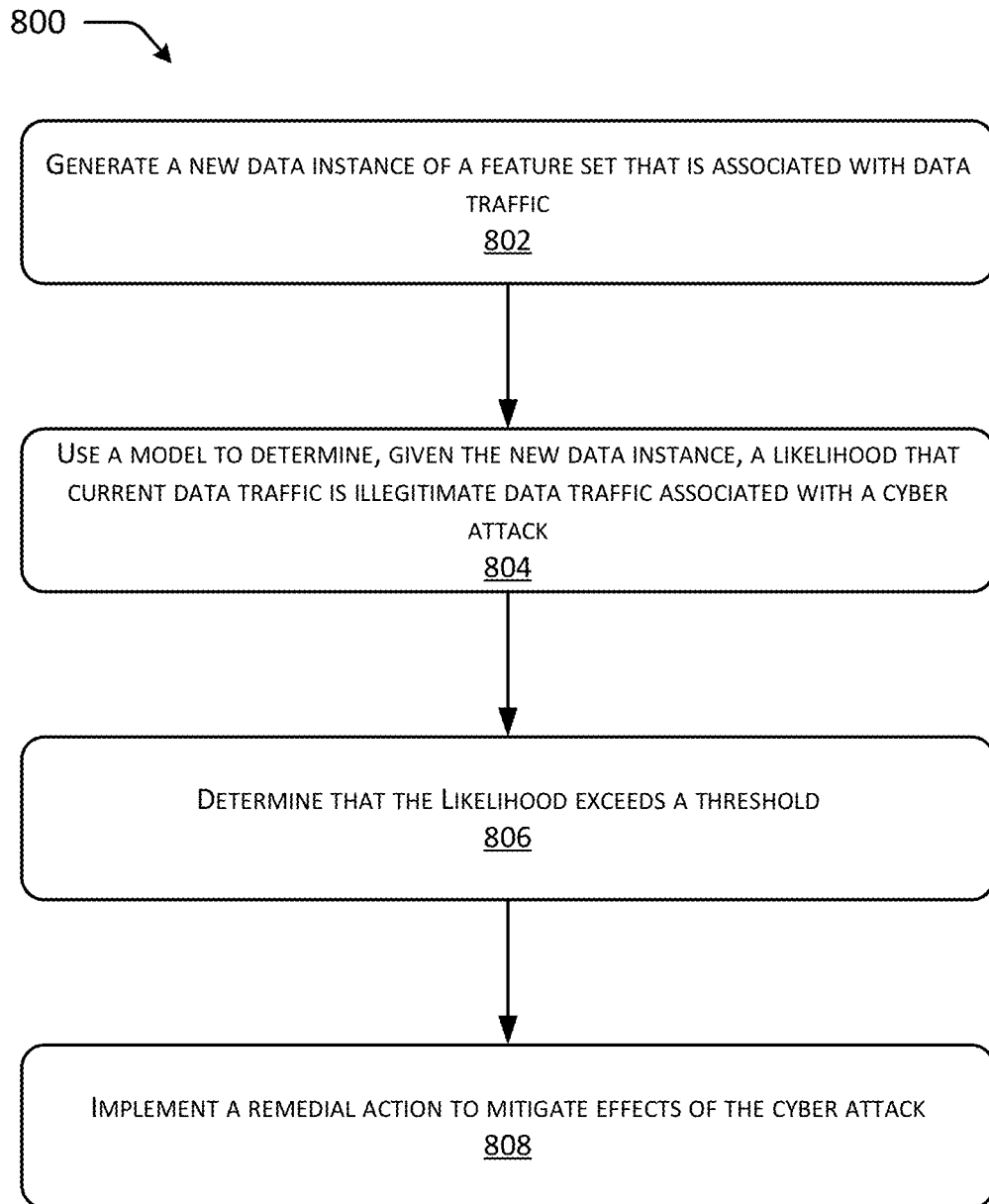
FIG. 8 is a diagram of an example flowchart that illustrates operations directed to using a model (e.g., a global model) to determine that a cyber attack is likely being carried out and to implement a remedial action based on the determination.

FIGS. 6-8 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., one or more devices of computing infrastructure 102 such as device 500) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 6 is a diagram of an example flowchart 600 that illustrates operations directed to computing a local model and a symbolic representation at a processing node, and subsequently sending the local model and the symbolic representation to other processing nodes so the local model can be combined with other local models to generate a global model. In one example, the operations of FIG. 6 can be performed by one or more devices and/or other components of computing infrastructure that provides a service (e.g., a processing node).

At operation 602, a feature set is defined for a security system configured to detect cyber attacks.

At operation 604, a set of local model parameters for a local model is computed via stochastic gradient descent (SGD) based on a training data subset that includes data instances of the feature set and a label indicating whether received data traffic comprises a known cyber attack. As described above, the local model is computed in parallel with other local models, based on a same set of starting model parameters.

At operation 606, a symbolic representation associated with the local model is computed. The symbolic representation represents how an adjustment to the set of starting model parameters affects the set of local model parameters computed for the local model.

At operation 608, in various examples, the symbolic representation (e.g., a matrix) is reduced by projecting the matrix from a first dimensional space to a second dimensional space of smaller dimension. For example, an identity matrix comprising a diagonal entry can be removed or subtracted from the matrix.

At operation 610, the local model and the symbolic representation are transmitted to one or more other processing nodes configured in other geographic locations.

In various examples, these operation in FIG. 6 can be repeated by a processing node. For example, the processing node can continuously update a local model based on a locally expanding training data subset. Moreover, the processing node can compute and/or transmit the local model and the symbolic representation in accordance with a schedule. In some examples, the processing node can receive a global model in return, the global model at that point becoming the local model that can be continuously updated.

FIG. 7 is a diagram of an example flowchart 700 that illustrates operations directed to combining local models into a global model using symbolic representations. In one example, the operations of FIG. 7 can be performed by one or more devices and/or other components of computing infrastructure (e.g., a processing node).

At operation 702, local models are received from other processing nodes.

At operation 704, symbolic representations associated with the local models are received from the other processing nodes.

At operation 706, the local models are combined using the symbolic representations to generate a global model that includes a set of global model parameters. As described above, the global model is configured to determine a likelihood of illegitimate data traffic that is associated with a cyber attack given a new (e.g., unlabeled) data instance of the feature set.

At operation 708, in various examples, the global model can be distributed to the other processing nodes.

FIG. 8 is a diagram of an example flowchart 800 that illustrates operations directed to using a model (e.g., a global model) to determine that a cyber attack is likely being carried out and to implement a remedial action based on the determination. In one example, the operations of FIG. 8 can be performed by one or more devices and/or other components of the computing infrastructure 102.

At operation 802, a new data instance of a feature set is generated. As described above, the new data instance is generated based on monitoring of current or recently received data traffic (e.g., data traffic received in the last five seconds, in the last ten seconds, in the last thirty seconds, in the last minute, etc.).

At operation 804, a model is used to determine, given the new data instance, a likelihood that at least some of the data traffic is illegitimate data traffic associated with a cyber attack.

At operation 806, it is determined that the likelihood exceeds a threshold.

At operation 808, a remedial action to mitigate the damaging effects of a cyber attack is implemented. For example, overflow or backup resources (e.g., servers) can be activated. In another example, IP addresses can be blocked. In yet another example, the illegitimate data traffic can be classified as dangerous and further connections to resources of the computing infrastructure can be prevented. In even a further example, a notification of the illegitimate data traffic can be generated and communicated the to a device associated with a computing infrastructure administrator.

The disclosure presented herein may be considered in view of the following example clauses.

Example Clause A, a method comprising: defining a feature set, an individual feature in the feature set being related to data traffic information; receiving, via a network at a first processing node of first computing infrastructure and from a plurality of other processing nodes of a plurality of other computing infrastructures, a plurality of local models that individually comprise a set of local model parameters computed via stochastic gradient descent (SGD) based at least in part on a training data subset that includes multiple data instances of the feature set and, for each data instance of the feature set, a label indicating whether received data traffic comprises a known cyber attack, wherein the plurality of local models and the sets of local model parameters comprised therein are computed in parallel by the plurality of other processing nodes based at least in part on a set of starting model parameters; receiving, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model; combining, at the first processing node using the plurality of symbolic representations, the plurality of local models received from the plurality of other processing nodes with a local model computed at the first processing node, the combining generating a global model that includes a set of global model parameters, the global model configured to determine, given a new data instance of the feature set, a likelihood of illegitimate data traffic that is associated with a cyber attack; generating, at the first processing node, the new data instance of the feature set based on monitoring data traffic of the first computing infrastructure; and determining, using the global model and the new data instance of the feature set, the likelihood of the illegitimate data traffic that is associated with the cyber attack.

Example Clause B, the method of Example Clause A, further comprising: determining that the likelihood of the illegitimate data traffic that is associated with the cyber attack exceeds a threshold; and implementing a remedial action to mitigate effects of the cyber attack.

Example Clause C, the method of Example Clause B, wherein the remedial action comprises one or more of: activating one or more overflow or backup servers; blocking an Internet Protocol (IP) address of a host or a source of the illegitimate data traffic; classifying the illegitimate data traffic as dangerous and preventing further connections to resources of the computing infrastructure; or generating a notification of the illegitimate data traffic and communicating the notification to a device associated with a computing infrastructure administrator.

Example Clause D, the method of any one of Example Clauses A through C, further comprising distributing the global model to the plurality of other processing nodes.

Example Clause E, the method of any one of Example Clauses A through D, wherein the feature set comprises at least two of: a number of data packets received in a defined period of time, a source or a host of a data packet identifiable via an Internet Protocol (IP) address, a rate at which data packets are received from a source or a host identifiable via an IP address, a number of connections in a defined period of time, a number of sources or hosts identifiable via an IP address that attempt to establish a connection in a defined period of time, a size of a data packet, or spacing of data packets.

Example Clause F, the method of any one of Example Clauses A through E, wherein the first processing node and the plurality of other processing nodes are configured in different datacenters operating in different geographic locations.

Example Clause G, the method of any one of Example Clauses A through F, wherein the set of global model parameters are essentially the same as a corresponding set of model parameters that would have been computed had the local model and the plurality of local models and the corresponding training data subsets been computed sequentially in an order in which the plurality of symbolic representations were applied rather than in parallel.

Example Clause H, the method of any one of Example Clauses A through G, wherein the adjustment is an unknown adjustment at a time the individual symbolic representation is computed.

Example Clause I, method of Example Clause H, wherein the adjustment to the set of starting model parameters comprises shifting the set of starting model parameters to a known set of starting model parameters associated with an output of another local model, the output comprising the set of local model parameters computed for the other local model.

Example Clause J, the method of any one of Example Clauses A through I, wherein the individual symbolic representation comprises a matrix.

Example Clause K, the method of Example Clause J, wherein a dimension of the matrix has been reduced by projecting the matrix from a first dimensional space to a second dimensional space of smaller dimension.

Example Clause L, the method of Example Clause K, wherein the second dimensional space is generated on random bases.

Example Clause M, the method of Example Clause K, wherein the plurality of local models and the plurality of symbolic representations are received based at least in part on a schedule that ensures that a variance associated with projecting the matrix from the first dimensional space to the second dimensional space is less than a threshold variance.

Example Clause N, the method of Example Clause K, wherein reducing the dimension of the matrix comprises removal of an identity matrix from the matrix, the identity matrix comprising a diagonal entry.

While Example Clauses A through N are described above with respect to a method, it is understood in the context of this disclosure that Example Clauses A through N can also and/or alternatively be implemented by a system, by a device, and/or via computer-readable storage media.

Example Clause O, a system comprising: one or more processing units; and a computer-readable medium having encoded thereon computer-executable instructions to cause the one or more processing units to: receive, via a network at a first processing node of first computing infrastructure and from a plurality of other processing nodes of a plurality of other computing infrastructures, a plurality of local models that individually comprise a set of local model parameters computed via stochastic gradient descent (SGD) based at least in part on a training data subset that includes multiple data instances of a feature set and, for each data instance of the feature set, a label indicating whether received data traffic comprises a known cyber attack, wherein the plurality of local models and the sets of local model parameters comprised therein are computed in parallel by the plurality of other processing nodes based at least in part on a set of starting model parameters; receive, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model; combine, at the first processing node using the plurality of symbolic representations, the plurality of local models received from the plurality of other processing nodes with a local model computed at the first processing node, the combining generating a global model that includes a set of global model parameters, the global model configured to determine, given a new data instance of the feature set, a likelihood of illegitimate data traffic that is associated with a cyber attack; generate the new data instance of the feature set based on monitoring data traffic of the first computing infrastructure; and determine, using the global model and the new data instance of the feature set, the likelihood of the illegitimate data traffic that is associated with the cyber attack.

Example Clause P, the system of Example Clause O, wherein the computer-executable instructions further cause the one or more processing units to: determine that the likelihood of the illegitimate data traffic that is associated with the cyber attack exceeds a threshold; and implement a remedial action to mitigate effects of the cyber attack.

Example Clause Q, the system of Example Clause P, wherein the remedial action comprises one or more of: activating one or more overflow or backup servers; blocking an Internet Protocol (IP) address of a host or a source of the illegitimate data traffic; classifying the illegitimate data traffic as dangerous and preventing further connections to other resources of the computing infrastructure; or generating a notification of the illegitimate data traffic and communicating the notification to a device associated with a computing infrastructure administrator.

Example Clause R, the system of any one of Example Clauses O through Q, wherein the adjustment to the set of starting model parameters comprises shifting the set of starting model parameters to a known set of starting model parameters associated with an output of another local model, the output comprising the set of local model parameters computed for the other local model.

Example Clause S, the system of any one of Example Clauses O through R, wherein the individual symbolic representation comprises a matrix, wherein a dimension of the matrix has been reduced by projecting the matrix from a first dimensional space to a second dimensional space of smaller dimension, wherein reducing the dimension of the matrix comprises removal of an identity matrix from the matrix, the identity matrix comprising a diagonal entry.

While Example Clauses O through S are described above with respect to a system, it is understood in the context of this disclosure that Example Clauses O through S can also and/or alternatively be implemented via a method, by a device, and/or via computer-readable storage media.

Example Clause T, a system comprising: one or more processing units; and a computer-readable medium having encoded thereon computer-executable instructions to cause the one or more processing units to: compute a local model that comprises a set of local model parameters computed via stochastic gradient descent (SGD) based at least in part on a training data subset that includes multiple data instances of a feature set and, for each data instance of the feature set, a label indicating whether received data traffic comprises a known cyber attack; compute a symbolic representation associated with the local model, wherein the symbolic representation comprises a matrix that represents how an adjustment to a set of starting model parameters affects the set of local model parameters computed for the local model; reduce a size of the matrix by projecting the matrix from a first dimensional space to a second dimensional space of smaller dimension; and transmit the local model and the symbolic representation to processing nodes over a network to enable a global model to be generated, the global model useable to determine, given a new data instance of the feature set, a likelihood of illegitimate data traffic that is associated with a cyber attack.

While Example Clause T is described above with respect to a system, it is understood in the context of this disclosure that Example Clause T can also and/or alternatively be implemented via a method, by a device, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:

defining a feature set, an individual feature in the feature set being related to data traffic information;

receiving, via a network at a first processing node of first computing infrastructure and from a plurality of other processing nodes of a plurality of other computing infrastructures, a plurality of local models that individually comprise a set of local model parameters computed via stochastic gradient descent (SGD) based at least in part on a training data subset that includes multiple data instances of the feature set and, for each data instance of the feature set, a label indicating whether received data traffic comprises a known cyber attack, wherein the plurality of local models and the sets of local model parameters comprised therein are computed in parallel by the plurality of other processing nodes based at least in part on a set of starting model parameters;

receiving, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model;

combining, at the first processing node using the plurality of symbolic representations, the plurality of local models received from the plurality of other processing nodes with a local model computed at the first processing node, the combining generating a global model that includes a set of global model parameters, the global model configured to determine, given a new data instance of the feature set, a likelihood of illegitimate data traffic that is associated with a cyber attack;

generating, at the first processing node, the new data instance of the feature set based on monitoring data traffic of the first computing infrastructure; and determining, using the global model and the new data instance of the feature set, the likelihood of the illegitimate data traffic that is associated with the cyber attack.

2. The method of claim 1, further comprising:
determining that the likelihood of the illegitimate data traffic that is associated with the cyber attack exceeds a threshold; and
implementing a remedial action to mitigate effects of the cyber attack.

3. The method of claim 2, wherein the remedial action comprises one or more of:
activating one or more overflow or backup servers;
blocking an Internet Protocol (IP) address of a host or a source of the illegitimate data traffic;
classifying the illegitimate data traffic as dangerous and preventing further connections to resources of the computing infrastructure; or
generating a notification of the illegitimate data traffic and communicating the notification to a device associated with a computing infrastructure administrator.

4. The method of claim 1, further comprising distributing the global model to the plurality of other processing nodes.

5. The method of claim 1, wherein the feature set comprises at least two of: a number of data packets received in a defined period of time, a source or a host of a data packet identifiable via an Internet Protocol (IP) address, a rate at which data packets are received from a source or a host identifiable via an IP address, a number of connections in a defined period of time, a number of sources or hosts identifiable via an IP address that attempt to establish a connection in a defined period of time, a size of a data packet, or spacing of data packets.

6. The method of claim 1, wherein the first processing node and the plurality of other processing nodes are configured in different datacenters operating in different geographic locations.

7. The method of claim 1, wherein the set of global model parameters are essentially the same as a corresponding set of model parameters that would have been computed had the local model and the plurality of local models and the corresponding training data subsets been computed sequentially in an order in which the plurality of symbolic representations were applied rather than in parallel.

8. The method of claim 1, wherein the adjustment is an unknown adjustment at a time the individual symbolic representation is computed.

9. The method of claim 8, wherein the adjustment to the set of starting model parameters comprises shifting the set of starting model parameters to a known set of starting model parameters associated with an output of another local model, the output comprising the set of local model parameters computed for the other local model.

10. The method of claim 1, wherein the individual symbolic representation comprises a matrix.

11. The method of claim 10, wherein a dimension of the matrix has been reduced by projecting the matrix from a first dimensional space to a second dimensional space of smaller dimension.

12. The method of claim 11, wherein the second dimensional space is generated on random bases.

13. The method of claim 11, wherein the plurality of local models and the plurality of symbolic representations are received based at least in part on a schedule that ensures that a variance associated with projecting the matrix from the first dimensional space to the second dimensional space is less than a threshold variance.

14. The method of claim 11, wherein reducing the dimension of the matrix comprises removal of an identity matrix from the matrix, the identity matrix comprising a diagonal entry.

15. A system comprising:
one or more processing units; and
a computer-readable medium having encoded thereon computer-executable instructions to cause the one or more processing units to:
receive, via a network at a first processing node of first computing infrastructure and from a plurality of other processing nodes of a plurality of other computing infrastructures, a plurality of local models that individually comprise a set of local model parameters computed via stochastic gradient descent (SGD) based at least in part on a training data subset that includes multiple data instances of a feature set and, for each data instance of the feature set, a label indicating whether received data traffic comprises a known cyber attack, wherein the plurality of local models and the sets of local model parameters comprised therein are computed in parallel by the plurality of other processing nodes based at least in part on a set of starting model parameters;
receive, at the first processing node and from the plurality of other processing nodes, a plurality of symbolic representations associated with the plurality of local models, wherein an individual symbolic representation associated with an individual local model is computed to represent how an adjustment to the set of starting model parameters affects the set of local model parameters computed for the individual local model;
combine, at the first processing node using the plurality of symbolic representations, the plurality of local models received from the plurality of other processing nodes with a local model computed at the first processing node, the combining generating a global model that includes a set of global model parameters, the global model configured to determine, given a new data instance of the feature set, a likelihood of illegitimate data traffic that is associated with a cyber attack;
generate the new data instance of the feature set based on monitoring data traffic of the first computing infrastructure; and determine, using the global model and the new data instance of the feature set, the likelihood of the illegitimate data traffic that is associated with the cyber attack.

16. The system of claim 15, wherein the computer-executable instructions further cause the one or more processing units to:
   determine that the likelihood of the illegitimate data traffic that is associated with the cyber attack exceeds a threshold; and
   implement a remedial action to mitigate effects of the cyber attack.

17. The system of claim 16, wherein the remedial action comprises one or more of:
   activating one or more overflow or backup servers;
   blocking an Internet Protocol (IP) address of a host or a source of the illegitimate data traffic;
   classifying the illegitimate data traffic as dangerous and preventing further connections to other resources of the computing infrastructure; or
   generating a notification of the illegitimate data traffic and communicating the notification to a device associated with a computing infrastructure administrator.

18. The system of claim 15, wherein the adjustment to the set of starting model parameters comprises shifting the set of starting model parameters to a known set of starting model parameters associated with an output of another local model, the output comprising the set of local model parameters computed for the other local model.

19. The system of claim 15, wherein the individual symbolic representation comprises a matrix, wherein a dimension of the matrix has been reduced by projecting the matrix from a first dimensional space to a second dimensional space of smaller dimension, wherein reducing the dimension of the matrix comprises removal of an identity matrix from the matrix, the identity matrix comprising a diagonal entry.

20. A system comprising:
   one or more processing units; and
   a computer-readable medium having encoded thereon computer-executable instructions to cause the one or more processing units to:
      compute a local model that comprises a set of local model parameters computed via stochastic gradient descent (SGD) based at least in part on a training data subset that includes multiple data instances of a feature set and, for each data instance of the feature set, a label indicating whether received data traffic comprises a known cyber attack;
      compute a symbolic representation associated with the local model, wherein the symbolic representation comprises a matrix that represents how an adjustment to a set of starting model parameters affects the set of local model parameters computed for the local model;
      reduce a size of the matrix by projecting the matrix from a first dimensional space to a second dimensional space of smaller dimension; and
      transmit the local model and the symbolic representation to processing nodes over a network to enable a global model to be generated, the global model useable to determine, given a new data instance of the feature set, a likelihood of illegitimate data traffic that is associated with a cyber attack.

* * * * *